(12) United States Patent
Nguyen

(10) Patent No.: US 6,445,312 B1
(45) Date of Patent: Sep. 3, 2002

(54) METHOD AND DEVICE FOR COMPRESSION BY BLOCKS OF DIGITAL DATA

(75) Inventor: Eric Nguyen, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/605,375

(22) Filed: Jun. 29, 2000

(30) Foreign Application Priority Data

Jul. 20, 1999 (FR) .............................. 99 09398

(51) Int. Cl.$^7$ ................................ H03M 7/00
(52) U.S. Cl. ............................ 341/50; 341/51
(58) Field of Search ............... 341/50, 51; 348/419.1, 348/420.1; 375/240.02

(56) References Cited

U.S. PATENT DOCUMENTS

| | | | |
|---|---|---|---|
| 5,329,379 A | 7/1994 | Rodriguez et al. | 358/433 |
| 5,563,961 A | * 10/1996 | Rynderman | 348/419 |
| 6,072,830 A | * 6/2000 | Proctor et al. | 348/422 |
| 6,125,398 A | * 9/2000 | Mirashrafi et al. | 709/236 |
| 6,233,017 B1 | * 5/2001 | Chaddha | 348/412 |

FOREIGN PATENT DOCUMENTS

| | | |
|---|---|---|
| EP | 0 594 338 A2 | 4/1994 |
| EP | 0 768 807 A3 | 4/1997 |

OTHER PUBLICATIONS

Andy C. Bavier et al., *"Predicting MPEG Execution Times"*, Department of Computer Science, The University of Arizona, in Proceedings SIGMETTRICS' '98.

Marco Mattavelli et al., *"Informative Annex About the Use and Implementation of Complexity Estimation and CGD"*, Document ISO/IECJTC1/SC29/WG11/MPEG98/M3073, Feb. 1998.

J. Lee et al., *"Rate–Distortion Optimized Frame Type Selection For MPEG Encoding"*, IEEE Transactions on Circuits and Systems for Video Technology, vol. 7, No. 3, Jun. 1997, pp. 501–510.

* cited by examiner

Primary Examiner—Howard L. Williams
(74) Attorney, Agent, or Firm—Fitzpatrick, Cella, Harper & Scinto

(57) ABSTRACT

A method of compression by blocks of digital data representing physical quantities comprises a coding configuration step (E3) in which there is associated with each block of digital data a coding technique chosen from amongst a set (E) of acceptable coding techniques as a function of a criterion.

The choice criterion is a function of optimization of the rate or distortion characterizing the coding configuration under the constraint of a given computational resource.

Use notably in a transmission videophone system.

26 Claims, 6 Drawing Sheets

METHOD AND DEVICE FOR COMPRESSION BY BLOCKS OF DIGITAL DATA

The present invention concerns a method of compression by blocks of digital data used notably in the field of the compression of a still or moving digital image.

It also concerns a compression device adapted to implement the compression method according to the invention.

The technical field of the invention is the compression, with loss, of digital data representing physical quantities, and notably representing the pixel value for a digital image, for applications such as videotelephony on a transmission network in which real-time compression methods are used.

The invention applies particularly to compression systems implemented by software, on an operating system capable of making the computing resources visible. The operating system can form part notably of a generic host computer, with shared resources limited notably with regard to computing resources.

A compression method is particularly considered in which the data to be compressed are first of all partitioned into a set of blocks, each of these blocks being coded by a coding technique chosen amongst a finite set of acceptable coding techniques.

Generally, coding techniques with loss are described on the one hand in terms of distortion, a distortion which becomes less and less corresponding to a finer and finer approximation of the coded digital signal, and on the other hand in terms of rate, that is to say coding cost.

In a conventional fashion, the different coding techniques applicable are chosen according to a rate/distortion compromise. It is a case in particular of best minimising the distortion under the constraint of an allocated rate or, conversely, best minimising the coding rate under the constraint of a given distortion.

However, the complexity of the compression algorithms used conventionally in the coding of digital data, and in particular during the coding of a video signal, is very great and makes real-time compression of a digital signal with reasonable resolution very difficult.

A technique making it possible to take into account this concept of time was disclosed in the document published in the context of the MPEG (Moving Picture Expert Group) standard entitled "Informative annex about the use and implementation of complexity estimation and CGD", by Marco Mattavelli and Sylvain Brunetton, Document ISO/IECJTC1/SC29NVG11/MPEG98/M3073, February 1998.

This technique, referred to as CGD (the acronym for "Computational Graceful Degradation") makes it possible to deliver, when a coded digital signal is compressed, a decoded signal of lesser quality when the required quality cannot be obtained in real time with the computing resources available on the operating system implementing the decoding.

However, this technique only makes it possible to adapt the decoder to the calculation resources of the system, as a function mainly of the structure of the bit stream generated by the compression operation used, in this case a compression according to the MPEG4 standard.

The present invention on the other hand relates to a compression method which can adapt to the computing resources of the system implementing it.

The present invention thus concerns a method of compression by blocks of digital data representing physical quantities, comprising a coding configuration step in which, with each block of digital data, there is associated a coding technique coded from amongst the set of coding techniques acceptable according to a criterion.

In accordance with the invention, this choice criterion is a function of optimisation of the rate or distortion characterising the coding configuration under the constraint of a given computational resource.

The compression method according to the invention makes it possible to choose a block coding configuration best using a computational resource, explicitly taking into account a compromise between the computational complexity and the performance in terms of rate/distortion of each available coding technique.

As a general rule, the greater the computational resource, the higher the rate/distortion performance. Thus, for a given computation time resource, it is a case of best consuming it by maximising the rate/distortion performance.

Preferably, this compression method comprises a computing step for each block of digital data and for each coding technique of an elementary consumed computational resource by the coding technique expressed in time of calculation.

Thus each coding technique is characterised in terms of consumed computational complexity, and no longer solely in terms of rate and distortion.

Advantageously, the computational resource incorporates the computing time for obtaining said elementary consumed computational resource and the consumed computational resource for resolving the optimisation function.

Thus a computational resource constraint is used which integrates both the resource consumed for obtaining elementary quantities but also the resource consumed by the optimisation algorithm in order to know the computational resource actually available for achieving the compression of the digital data.

According to different particularly practical embodiments of the invention, the optimisation function is adapted to minimise a rate associated with the coding configuration for a computational complexity less than a given computational resource; or the optimisation function is adapted to minimise a mean distortion associated with the coding configuration for a computational complexity less than a given computational resource; or the optimisation function is adapted to minimise an upper bound distortion associated with the coding configuration for a computational complexity less than a given computational resource.

According to another preferred characteristic of the invention, the compression method comprises a prior step of choosing a criterion amongst a function of optimisation of the rate or of the distortion characterising the coding configuration under the constraint of a given computational resource, a function of optimisation of the rate characterising the coding configuration under the constraint of a given distortion and a function of optimisation of the distortion characterising the coding configuration under the constraint of a given rate.

The compression method thus advantageously makes it possible to effect a normal optimisation of the rate/distortion performance (that is to say a minimisation of the distortion under the constraint of a given rate or a minimisation of a rate under the constraint of a given distortion) when no calculation time constraint is required for compressing the digital signal.

In practice, the said set of acceptable coding techniques comprises inter coding techniques, such as a predictive coding by movement compensation, a coding by time prediction or a coding by multilinear prediction, and intra coding techniques, such as a coding by spectral transformation or a coding by vector quantisation.

The compression method according to the invention thus makes it possible to choose, amongst conventional coding techniques, those which best meet the choice criterion.

According to a preferred characteristic of the invention, which also makes it possible to improve the coding of a set of digital data, the compression method also comprises a step of partitioning into blocks of digital data representing physical quantities, in which the partitioning of blocks is effected by a partitioning under the constraint of a given computational resource.

Thus a partitioning of the digital data is effected which makes it possible to best use the available computational resources of the system implementing the compression.

In practice, the present invention is particularly well suited to a compression method comprising a step of partitioning into blocks of digital data representing a digital image or a digital video signal.

Correlatively, the present invention concerns a device for compressing by blocks of digital data representing physical quantities, comprising coding configuration means adapted to associate, with each block of digital data, a coding technique chosen from amongst a set of acceptable coding techniques as a function of a criterion, the choice criterion being a function of optimisation of the rate or distortion characterising the coding configuration under the constraint of a given computational resource.

This compression device has characteristics and advantages similar to those described previously for the compression method according to the invention.

In practice, this compression device is incorporated in a microprocessor, a read only memory being adapted to store a program of compression by blocks of digital data, and a random access memory comprising registers for storing variables modified during the running of said program.

According to one advantageous characteristic of the invention, the microprocessor is adapted to supply the value of a given computational resource at a given moment.

The compression method implemented on this device can thus advantageously choose a coding configuration by using an optimisation function under a computational resource constraint determined by the microprocessor.

The present invention also concerns a computer, a digital image processing apparatus, a digital printer, a digital photographic apparatus, a digital camera or a video telephony system on a transmission network comprising a compression device according to the invention.

It also relates to a computer program product, incorporated in fixed or removable fashion in a compression device, comprising software code portions adapted to implement the compression method according to the invention.

The advantages of this computer, digital image processing apparatus, digital printer, digital photographic apparatus, digital camera, video telephony system on a transmission network or computer program product are similar to those of the compression method which they implement.

Other particularities and advantages of the invention will emerge from the following description.

In the accompanying drawings, given by way of non-limitative examples:

A description will be given below of a method of compression by blocks in accordance with the invention applied to a colour video digital signal.

Naturally, the digital data to be compressed can be any data representing physical quantities, and notably a digital image, still or moving, in colour or black and white.

In a video signal, each image I to be compressed comprises three components: a luminance component and two chrominance components. In the compression diagram described below it is considered that the components are compressed sequentially and independently of each other. Only the compression of one of these components will be described below.

Figure 1:
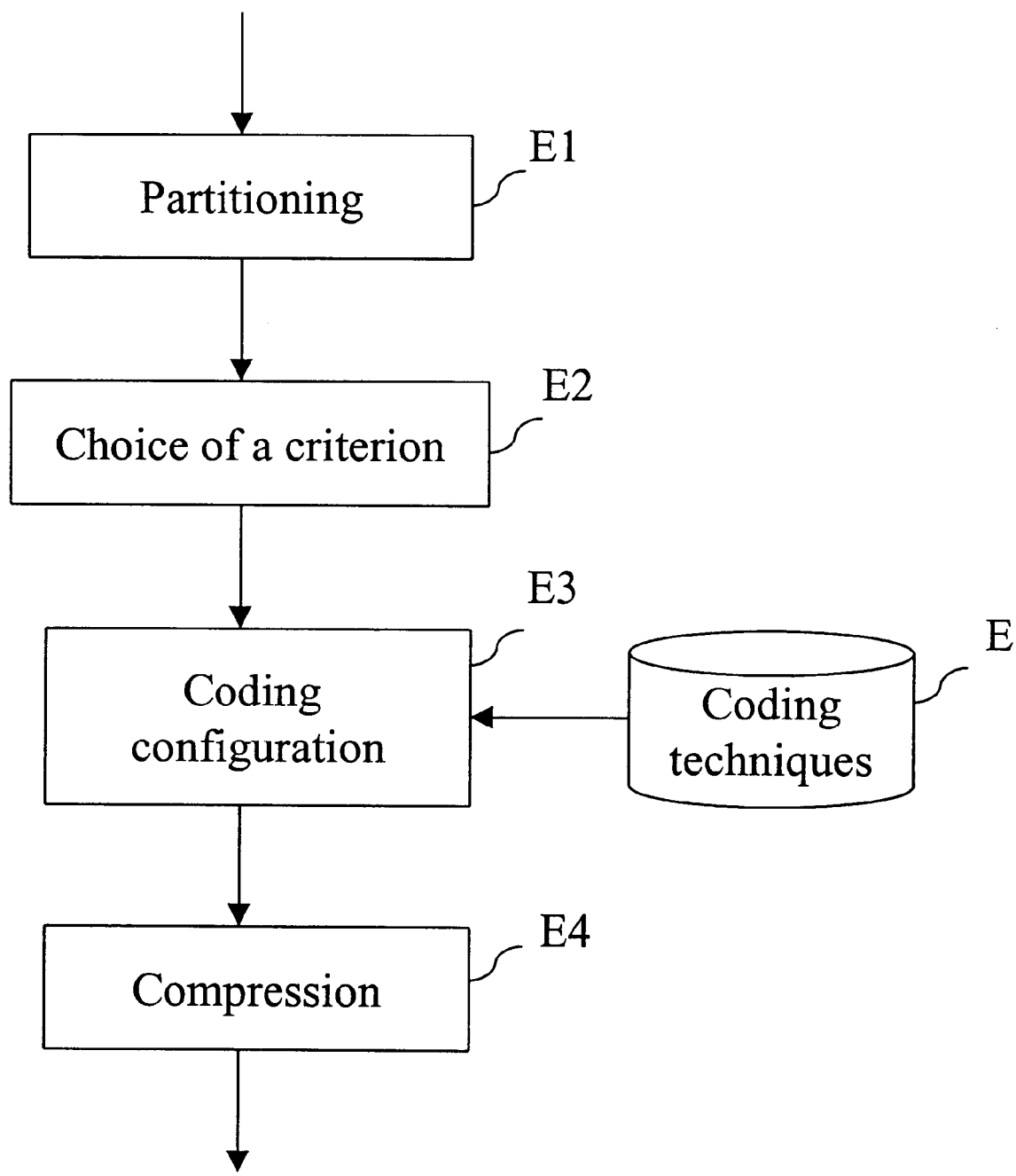
FIG. 1 is a general algorithm of the compression method applied to a digital image I according to the invention.

The method of compressing a digital image I comprises first of all, with reference to FIG. 1, step E1 of partitioning each component to be compressed into a set of blocks.

Thus each component is divided into blocks of size p×p, typically 16×16 or 8×8. Naturally, these blocks could be other than square.

For each component of size L×H, there exist $$N = \frac{L}{p} \times \frac{H}{p}$$

blocks to be coded. In the remainder of the description these blocks are denoted $a_i$, with i=1, ... ,N.

In this embodiment of the invention, and non-limitatively, the compression method comprises a prior step of choosing a criterion E2 as a function of which there will be chosen, for each block $a_i$, a coding technique, denoted $m_j$, with j=1, ... ,K, chosen from amongst K acceptable coding techniques.

The choice of the criterion made at the choosing step E2 can be made amongst several optimisation functions such as:

rate optimisation functions, characterising each coding configuration $\{m_j[a_i]\}$ under the constraint of a given distortion, or distortion optimisation functions, characterising each coding configuration $\{m_j[a_i]\}$ under the constraint of a rate, or in accordance with the invention, optimisation of the rate or distortion characterising each coding configuration $\{m_j[a_i]\}$ under the constraint of a given computational resource.

Amongst the coding techniques conventionally used in video signal compression schemes, there can be distinguished the coding techniques known as inter and the coding techniques known as intra.

For the record, in inter coding techniques, each block under consideration is coded with reference to a block of a so-called reference image, and in intra coding techniques each block under consideration is coded solely with reference to the current image to which it belongs.

Amongst the inter coding techniques, there is notably predictive coding by movement compensation.

Amongst the intra coding techniques, there are for example coding by spectral transform of the digital signal (discrete cosine transform or discrete wavelet transform) and coding by vector quantisation.

These coding techniques are used in the standard compression schemes such as H.261 and H.263 of the ITU (International Telecommunication Union) and MPEG-1, MPEG-2 and MPEG-4 of the ISO (International Standards Organisation) and do not require to be described in detail here.

These coding techniques can be distinguished, apart from their nature as mentioned above, also by a particular choice of coding parameters (for example a particular choice of quantisers for a transform coding).

Each coding technique $m_j$ is characterised at the same time by rate, distortion and computational complexity quantities.

The rate, denoted $r(m_j[a_i])$, is expressed in bits and measures the length of the output code representing the block $a_i$ coded by the technique $m_j$. This rate comprises both the length of an identifier of the technique $m_j$ and the length of any parameters or data necessary for decoding. This rate value $r(m_j[a_i])$ can be determined in advance, being either fixed in the case of a code with a fixed length or predicted or estimated in the case of a variable-length coding as a function of a probability model.

For example, in the case of an arithmetic coding in which the probability of appearance p of each coding symbol is estimated adaptively, an estimation of the length of the code can be given, by number of estimated bits, by the function $-\log_2(p)$ (referred to as self-information).

The resulting distortion, denoted $d(a_i, â_i[m_j])$, expresses the distance d between the original block $a_i$ and its approximation $â_i[m_j]$ obtained by means of the coding technique $m_j$.

A distance measurement normally used in image compression is the root mean square error. This is generally calculated between the block $a_i$ and the reconstructed block $â_i[m_j]$, which requires consumption of computational resources. The value of the distortion can also be predicted by using for example a rate/distortion model adapted to the coding technique under consideration.

Such rate/distortion models are described notably in the work entitled "Vector quantization and signal compression", by A. Gersho and R. Gray, Kluwer Academic Publisher, 1992, for coding by vector quantisation.

Finally the complexity, denoted $c(m_j[a_i])$, expresses the computational resource consumed by application of the technique $m_j$ to the block $a_i$. This computational resource can be expressed as the machine time of the coding process. Other complexity measurements could also be considered, taking into account the quantity and type of elementary operations performed by the processor (CPU) of the machine and the data communications necessary to the execution of the coding process. Modelling and complexity measuring means are given for example in the document published in the context of the MPEG (Moving Picture Expert Group) standard entitled "Informative annex about the use and implementation of complexity estimation and CGD", by Marco Mattavelli and Sylvain Brunetton, Document ISO/IECJTC1/SC29WG11/MPEG98/M3073, February 1998, and in the document entitled "Predicting MPEG Execution Times" by Andy C. Bavier et al, Department of Computer Science, University of Arizona, Sigmetrics '98, proceedings page 131, June 98.

It is generally verified that the computing time measured by means of system calls (corresponding, on an operating system of the UNIX type, to a CPU time complexity) various substantially linearly with the number of discrete operations performed by each coding technique.

For coding techniques with "regular" complexity, that is to say not depending on data of the block to be coded $a_i$, a simple way of estimating the complexity $c_j$ for each coding technique $m_j$, is to effect an estimation by least squares on measurements $C_i=n_ic_j+C_o$ where $C_i$ is the measurement of the calculation time, $n_i$ represents the number of calls on the coding technique under consideration for several values of $n_i$ and $C_o$ represents a residual offset value which is assumed to be constant. The estimated value is of course dependent on the host machine, the operating system, the compiler and the compiling options used for generating the executable program, but it can be produced once and for all during an initialisation phase, for example before the start of compression.

In this example embodiment it is considered that there is a set E of four acceptable coding techniques. The techniques cited below are well known in the state of the art and are described only briefly below.

The code identifying the coding technique can be coded in a fixed length in two bits, application of each of these techniques being considered equiprobable in principle.

A first technique $m_1$ of the set E is an inter coding by time prediction. In such a technique, the current block $a_i$ of the image at time t is considered to be the block corresponding to the same spatial condition in the reference image, which can be the previous image at time (t−1), so that $â_i(t)=â_i(t-1)$.

This technique does not require the transmission of any parameter. This therefore gives $r(m_1[a_i])=r(m_1)=2$ bits.

It can in practice be found, for a normal computer and compiler, that the computational complexity is proportional to the number of pixels in the block, that is to say $c(m_1[a_i])=p^2 \times c(m_1)$. This complexity corresponds to the calculation of the distortion.

The proportionality factor $c(m_1)$ is estimated by least squares on a set of calculation time measurements obtained for different block size values.

A second technique $m_2$ of the set E is an inter coding by movement compensation. In such a technique, the current block $a_i$ of the image at time t is predicted in the direction of the movement by a moved block of the reference image, which can be the previous image at time (t−1).

The movement of the block is estimated amongst a set of possible solutions (a set referred to as the search window) by different techniques known to persons skilled in the art which it is not necessary to detail here. These techniques require the transmission of the movement vector for decoding.

A fixed-length code is for example considered: for a search window of size (2w+1)×(2w+1), a code of length $\log_2(4w^2+4w)$ rounded up to the integer value above.

For example, w=2, a code of 5 bits is necessary and consequently this gives $r(m_2[a_i])=r(m_2)=2+5$ bits.

It is, as before, found in practice that, for a normal computer and compiler, the computational complexity is proportional to the number of pixels in the block, that is to say $c(m_2[a_i])=p^2 \times c(m_2)$. This complexity corresponds to the calculation of the distortion during the search for the best movement vector.

The proportionality factor $c(m_2)$ is estimated by least squares on a set of calculation time measurements obtained for different block size values.

A third technique $m_3$ of the set E is an inter coding by multilinear prediction as described in French patent application 97 08647 in the name of the Applicant.

This technique requires the transmission of four prediction coefficients and one offset value. This therefore gives $r(m_3[a_i])=r(m_3)=2+13$ bits.

It is also shown that, in practice, for a normal computer and compiler, the computational complexity is proportional to the number of pixels in the block, that is to say $c(m_3[a_i])=p^2 \times c(m_3)$.

The proportionality factor $c(m_3)$ is estimated by least squares on a set of calculation time measurements obtained for different block size values.

A fourth technique $m_4$ of the set E can be an intra coding by hierarchical table look-up vector quantisation (HTLVQ). This technique is detailed for example in the article entitled "Constrained and Recursive Hierarchical Table Look-up Vector Quantization" by N. Chaddha, Proceedings of the Data Compression Conference, April 1996.

This technique requires the transmission of the quantisation index indicating the vector best representing the block to be coded of size p×p. The necessary rate depends on the cardinal of the quantisation dictionary used. If a dictionary with a cardinal of 256 is used, coding in 8 bits is sufficient. This therefore gives $r(m_4[a_i])=r(m_4)=2+8$ bits.

Here also, it is found that in practice, for a normal computer and compiler, the computational complexity is proportional to the number of pixels in the block, that is to say $c(m_4[a_i])=p^2 \times c(m_4)$. This complexity corresponds approximately to the number of memory accesses necessary for coding by HTLVQ.

The proportionality factor $c(m_4)$ is estimated by least squares on a set of calculation time measurements obtained for different block size values.

In accordance with the invention, the choice criterion used for determining the coding configuration during a configuration step E3 is a function of optimisation of the rate or distortion characterising the coding configuration under the constraint of a given computational resource.

Since each coding technique $m_j$ is characterised as described previously in terms of computational complexity $c(m_j)$ and at least in terms of rate or distortion, it is possible to use an optimisation function which makes it possible to best use the computational resources available on the system implementing the compression method.

At the end of this configuration step, there is a combination $\{m_j[a_i], i=1, \ldots, N\}$ which is referred to as the coding configuration and which is optimum in the sense of the chosen criterion calculated on all the blocks $a_i$ to be compressed.

Thus, assuming a distinct coding of each of the blocks and sequential implantation of the compression method, the following can be noted:

a rate R equal to the sum of the constituent rate values:

$$R = \sum_{i=1}^{N} r(m_j[a_i])$$

a complexity C equal to the sum of the constituent complexity values:

$$C = \sum_{i=1}^{N} c(m_j[a_i]) + C_0$$

where $C_o$ represents an offset value integrating the data input/outputs, the displays and any other processing of constant complexity independent of the coding configuration, and a mean distortion $$D = \sum_{i=1}^{N} d(a_i, \hat{a}_i[m_j])$$

or an upper bound distortion $$D = \sup_i d(a_i, \hat{a}_i[m_j])$$

the choice of one or other of the distortion measurements being dictated by considerations of a psycho-visual nature for an image or video signal or psycho-acoustic for an audio signal.

Thus, in this example where the digital data to be compressed represent a video signal, it can be considered that an upper bound distortion is best suited in that the human eye is sensitive to variations of high magnitude localised in space and time, which is the case with the blocks of a video image.

Thus different optimisation functions can be used for determining the coding configuration at step E3.

The optimisation function can be adapted to minimise the rate R associated with the coding configuration for a computational complexity C lower than a given computational resource, denoted $C_a$:

$$\min R = \sum_{i=1}^{N} r(m_j[a_i]); C = \sum_{i=1}^{N} c(m_j[a_i]) \leq C_a$$

The optimisation function can also be adapted to minimise a mean distortion D associated with the coding configuration for a computational complexity C less than a given computational resource $C_a$:

$$\min D = \sum_{i=1}^{N} d(a_i, \hat{a}_i[m_j]); C = \sum_{i=1}^{N} c(m_j[a_i]) \leq C_a$$

Finally, the optimisation function can be adapted to minimise an upper bound distortion D associated with the coding configuration for a computational complexity C less than a given computational resource $C_a$:

$$\min D = \sup_i d(a_i, \hat{a}_i[m_j]); C = \sum_{i=1}^{N} c(m_j[a_i]) \leq C_a$$

Since the constituent values characterising each acceptable coding technique of the set E are known, these optimisation functions are problems of discrete allocation which can be resolved numerically by known methods, the simplest but most complex in calculation time being the exhaustive enumeration of all the possible configurations and the choice of the best one in the sense of the criterion considered.

It should be noted that the first two optimisation functions mentioned above are equivalent to a problem of allocation of a separable resource which can be resolved by a rapid technique of convex programming well known in digital data compression and described for example, in the case of a rate-distortion optimisation, in the document entitled "Joint optimisation techniques in image and video coding with applications to multiresolution digital broadcast", by K. Ramchandran, doctoral thesis at the University of Columbia, June 1993.

By way of example, it is considered in the remainder of the description that the choice criterion corresponds here to the aforementioned function of optimisation of the upper value distortion under the constraint of an allocated computational resource $C_a$.

The computational resource constraint also incorporates the calculation time $C_e$ for obtaining constituent consumed computational resources $C_o$ for resolving the optimisation function so that the computational resource actually available is $C_a' = C_a - C_e - C_o$.

Obviously, if Ca' is negative, compression is not possible. It is therefore important to know in advance (that is to say without consuming any computational resource), or to rapidly estimate the constituent quantities necessary for the optimisation function and to use a fast optimisation algorithm.

Figure 2:
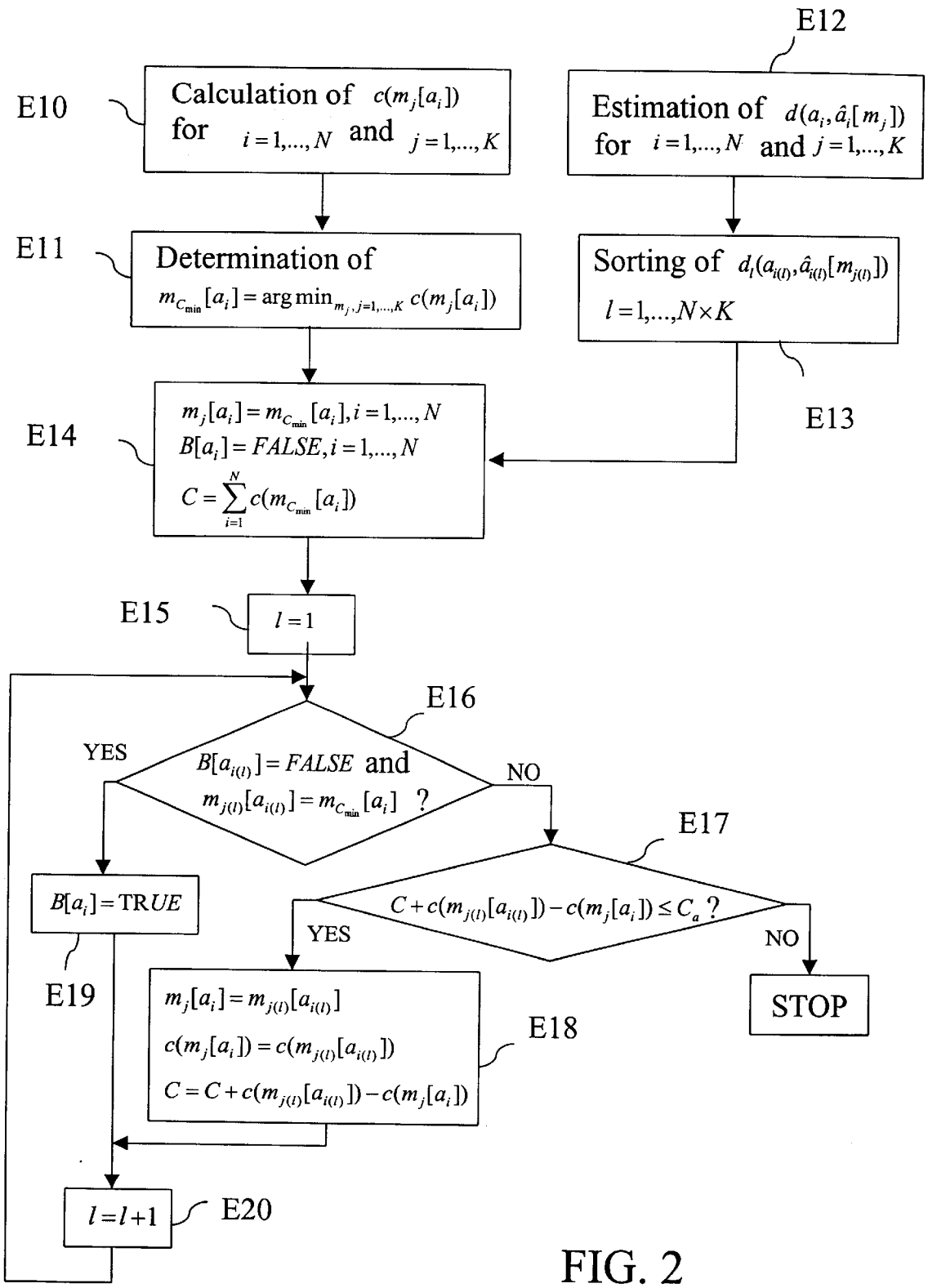
FIG. 2 is an algorithm detailing the coding configuration step of the compression method according to a first embodiment of the invention.

The resolution of the function of optimisation of the upper bound distortion will now be described in detail in a first embodiment of the invention illustrated in FIG. 2.

This algorithm for resolution of the optimisation function comprises first of all a calculation step E10 for each block $a_i$ of digital data and for each coding technique $m_j$ for a constituent consumed computational resource c by means of the coding technique expressed in calculation time.

Examples of estimation of the constituent value of the consumed computational resource were described previously for four acceptable coding techniques for the set E.

It is of course assumed that the problem admits of a solution, that is to say that $$\min_{\{m_j[a_i]\}} \sum_{i=1}^{N} c(m_j[a_i]) \leq C_a.$$

It will also be assumed here that the elementary distortion values d can be estimated a priori, for example by means of a rate/distortion model linking an observed or measured value (for example the energy of the block to be coded) to the distortion.

A step E12 of estimating the distortions $d(a_i, \hat{a}_i[m_j])$ for $i=1, \ldots, N$ and $j=1, \ldots, K$ is thus implemented.

In a sorting step E13 consideration is given to the list sorted by decreasing values of the values $d(a_i, \hat{a}_i[m_j])$. Let these values sorted by decreasing order be $d_l(a_{i(l)}, \hat{a}_{i(l)}[m_{j(l)}])$ with $l=1, \ldots, N \times K$.

Because of the upper bound distortion measurement, each value of the sorted list represents an acceptable value of the total distortion.

It is then necessary to find a coding configuration associated with a distortion $d_l(a_{i(l)}, \hat{a}_{i(l)}[m_{j(l)}])$ with the highest rank I, in the acceptable complexity domain.

One solution is to start from the coding configuration of minimum complexity and to sequentially modify the pairs $m_j[a_i]$ so as to reduce the distortion until the allocated complexity resource Ca is completely consumed.

Thus a determination step E11 makes it possible to determine this minimum complexity coding configuration, that is to say the configuration consisting of the set $\{m_{Cmin}[a_i]\}$ where $m_{Cmin}[a_i] = \arg\min_{\{m_j, j=1, \ldots, K\}} c(m_j[a_i])$.

An initialisation step E14 is then implemented: the initial coding configuration consisting of the set $\{m_{Cmin}[a_i]\}$ with $i=1, \ldots, N$, the value of the consumed computational resource C with this coding configuration is initialised by $$C = \sum_{i=1}^{N} c(m_{Cmin}[a_i])$$

and a boolean value $B[a_i]$ is initialised to "false" for every $i=1, \ldots, N$.

As from step E15, the list of the $d_l(a_{i(l)}, \hat{a}_{i(l)}[m_{j(l)}])$ values is then run through in order to optimise the distortion and, at step E18, the corresponding pairs $m_{j(l)}[a_{i(l)}]$ in the current coding configuration are modified by updating the consumed complexity $C = C + c(m_{j(l)}[a_{i(l)}]) - c(m_j[a_i])$. The distortion is therefore reduced at the expense generally of an increase in computational complexity.

However, the technique associated with a block $a_i$ must be modified only if the pair $m_{Cmin}[a_i]$ in the list has already been run through; in the contrary case, the default technique $m_{Cmin}[a_i]$ necessarily results in lesser distortion for a lesser complexity.

This condition is satisfied by virtue of the test of step E16. Use is made there of a boolean value previously initialised to false for each $a_i$ and set to "true" at step E19 as soon as the minimum complexity technique associated with the block $a_i$ is achieved. If the boolean variable is true then the coding technique can be modified and the following technique is considered at step E20, incrementing by one unit the index I of passing through the sorted list. The optimisation algorithm stops when the available computational resource Ca is consumed. This condition is satisfied by a test E17 which makes it possible, before the configuration modification step E18, to verify whether the current complexity value C is less than the allocated value $C_a$. When this allocated value is achieved, the current coding configuration is then the chosen configuration.

It can be remarked that the actual coding of the blocks $a_i$ can take place only once optimisation has been achieved.

Returning to FIG. 1, this optimum coding configuration, which associates a coding technique with each block of data to be compressed, is then used in a conventional fashion in a compression step E4 adapted to code the digital image I in a compressed data file F.

In this first embodiment, it was assumed that it was possible to estimate the values of constituent distortion quantities $d(a_i, \hat{a}_i[m_j])$. However, as remarked previously, this is not always possible.

A description will now be given, with reference to FIGS. 3 and 4 of a second embodiment in which these constituent quantities must actually be calculated on the data after coding, that is to say the required consumption of a computational resource associated with each technique.

The steps of calculating the elementary complexities E21 and determining E22 the minimum complexity configuration $\{m_{Cmin}[a_i]\}$ are identical to the previously described calculation E10 and determination E11 steps.

Next, in a calculation step E23, the resulting constituent distortion $d(a_i, \hat{a}_i[m_{Cmin}[a_i]])$ for each block $a_i$ with $i=1, \ldots, N$ is calculated.

A calculation step E24 makes it possible, as at the previously described initialisation step E14, to calculate the initial value of the computational complexity C obtained for the minimum-complexity coding configuration.

The initial distortions are stored at the storage step E25 (with the index of the block and the coding parameters associated with the technique) in a list sorted by decreasing values of distortions $d_l(a_{i(l)}, \hat{a}_{i(l)}[m_{j(l)}]) \geq d_{l+1}(a_{i(l+1)}, \hat{a}_{i(l+1)}[m_{j(l+1)}])$ with $m_{j(l)}[a_{i(l)}] = m_{Cmin}[a_{i(l)}]$ in the initial state. The algorithm then proceeds by testing, for the maximum-distortion block situated at the top of the list, the other coding techniques which have not yet been tested; if a lesser distortion is obtained, then the coding configuration is updated by modifying the index of the method for the block under consideration (and the associated coding parameters) and then the ordering of the list is updated by moving the block from the top of the stack to the rank corresponding to the new value of the distortion. It is a case in fact of an algorithm for managing a stack of fixed size with priority to the maximum-distortion element. The processing of the stack E26 is carried out as long as the current complexity C remains less than the available computational resource $C_a$.

Figure 4:
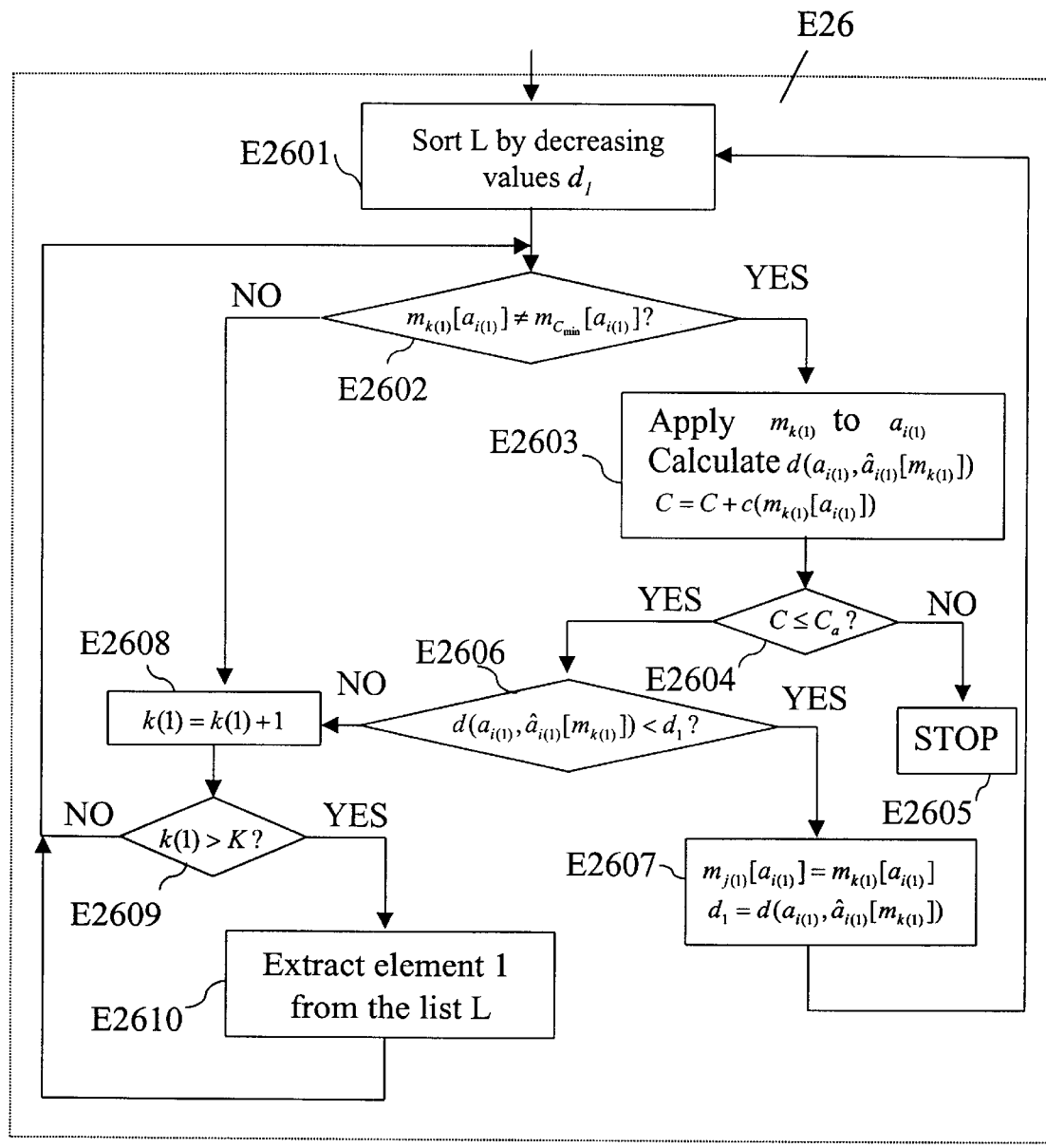

This processing E26 is detailed in FIG. 4.

Step E2601 consists of sorting the list of elements formed at the previous step E25 by decreasing distortion values $d_j$. The algorithm then operates on the first element in the list of index I=1 with maximum current distortion $d_1$. The first coding technique of index k(1) is then tested at step E2603 other than the minimum-complexity technique (test of step E2602). The resulting distortion $d(a_{i(1)}, \hat{a}_{i(1)}[m_{k(1)}])$ is calculated and the consumed computational resource C is updated. If the allocated resource $C_a$ is not all consumed (test of step E2604) and if the resulting distortion is less than the current distortion $d_1$ (test of step E2606), then the technique and the current distortion are updated at step E2607. The list is then updated in the sense of sorting by decreasing distortion value at step E2601.

It should be noted that, at this level, it suffices to move the first element of the list which has just been modified. If the method under consideration of index k(1) affords no saving in distortion (negative result of test E2606), the index k(1)+1 is incremented and the algorithm is resumed at step E2602 if there actually remain techniques which have not yet been tested, that is to say as long as k(1) is less than K (test of step E2609).

Where all the acceptable techniques have been tested (i.e. k(1)>K), the current configuration for the block is accepted. In order to continue the algorithm, it is then necessary to extract the element from the list at the extraction step E2610 since the latter would be permanently situated at the top of the list.

The previously described step E2602 is then returned to directly since the order of the list has not been changed. The algorithm stops at step E2605 when the consumed resource C reaches the allocated resource $C_a$ (test of step E2604).

In this example embodiment, the computational resource consumed by the algorithm itself has not been considered. It could notably be considered that the sorting step E2601 consumes the computational resource in a not insignificant fashion. In this case, the value of C must be updated in a suitable manner within step E2601.

Figure 5:
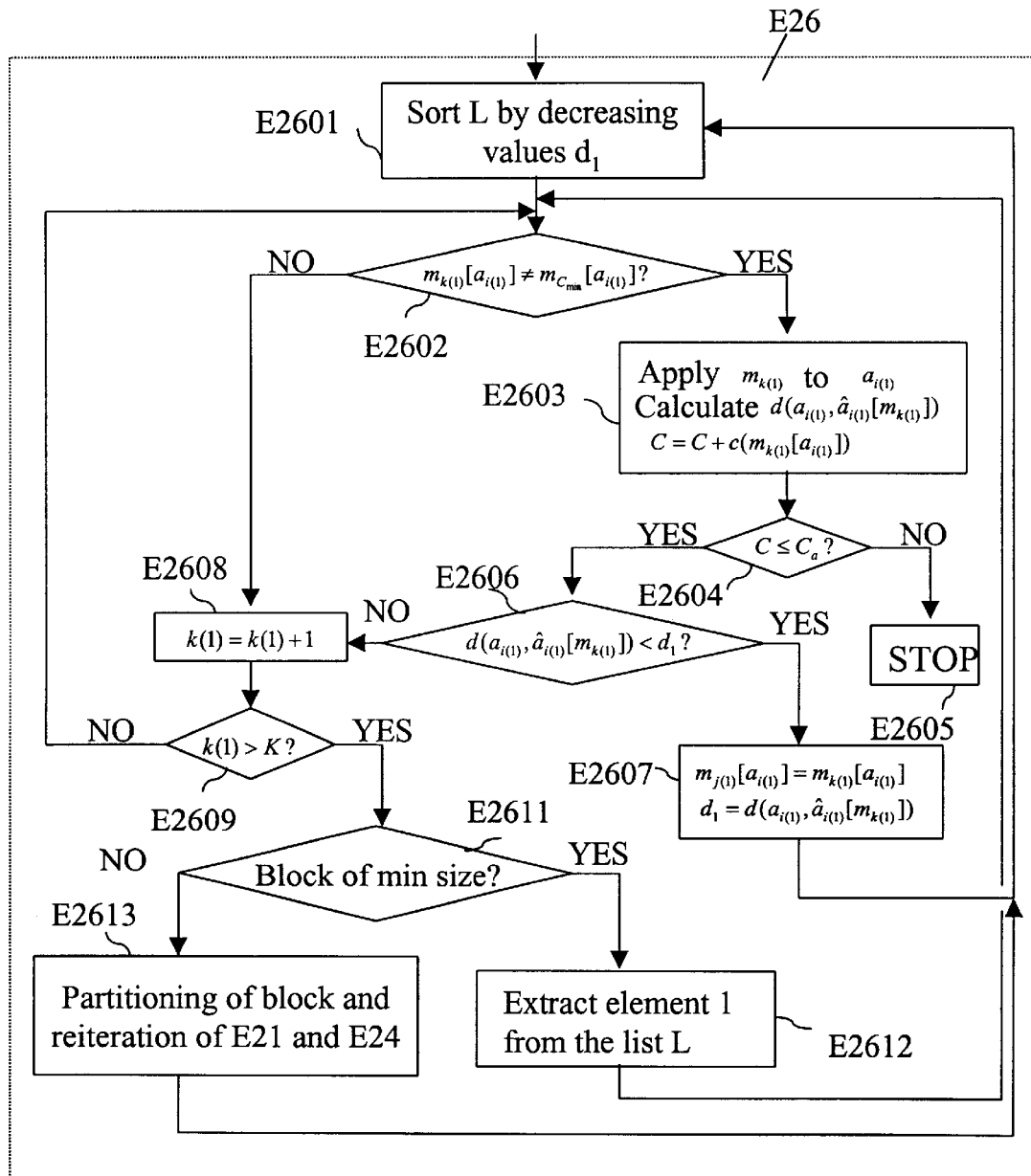
FIG. 5 is an algorithm illustrating a variant of FIG. 4 according to a third embodiment of the invention.

A description will now be given, with reference to FIG. 5, of another embodiment of the invention in which step E1 of partitioning into blocks is effected by an adaptive partitioning under the constraint of a given computational resource.

A spatial partitioning of the video signal into a quadtree is considered here by way of non-limitative example.

It is in fact known, in digital image processing, to adapt the coding to the spatial content of the image. For this, it is sometimes beneficial to enable the partitioning to adapt by allowing blocks of variable size in the partitioning.

One possible means is to adopt a structured partitioning into a quadtree. In this structure, a given block with a size p×p of an additional "root" partitioning can be divided into four sub-blocks of size $$\frac{p}{4} \times \frac{p}{4}$$

and so on as far as a predetermined minimum block size.

The information representing the spatial partitioning must then be transmitted with the coding data (choice of the technique and associated parameters) for each block of the partitioning. This information can take the form of a new coding technique which refers to the partitioning of the block into four sub-blocks which is to be processed recursively.

In practice, rather than inserting a new element in the list of techniques, it is preferred to code the division information (or structural information) separately. The code associated with each of the blocks then contains a supplementary bit indicating whether the block under consideration has been divided or coded just as it is.

A description will be given, with reference to FIG. 5, of the variant of the optimisation algorithm described previously with reference to FIG. 4, in which the elementary distortions are calculated.

Figure 3:
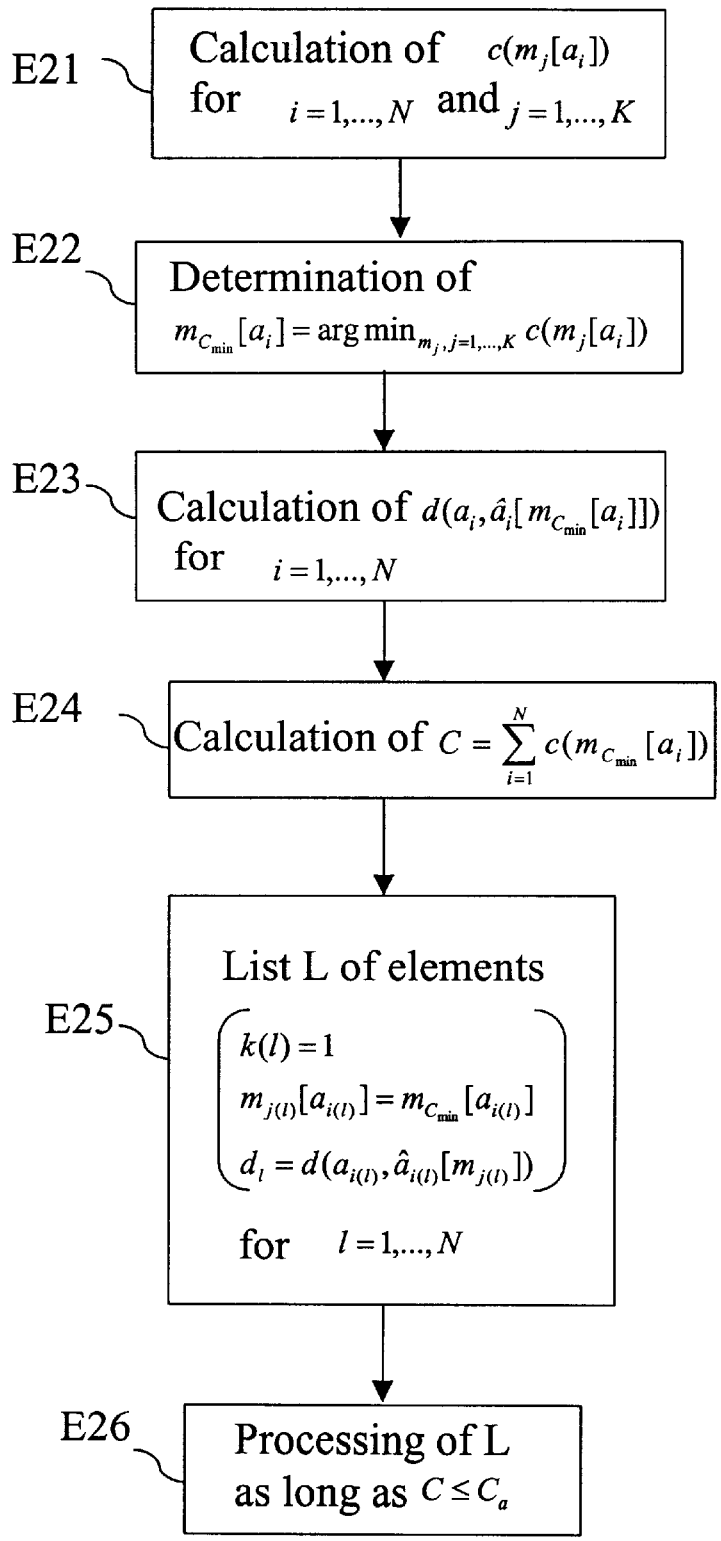
FIGS. 3 and 4 are algorithms detailing the coding configuration step of the compression method according to a second embodiment of the invention.

The first steps E21 to E25 described with reference to FIG. 3 are unchanged, only the step of processing the list E26' being modified as described below.

The processing steps E2601 to E2609 are also identical to those described previously.

On the other hand, at the end of the test step E2609, where all the acceptable coding techniques have been tested (i.e. k(1)>K), it is tested whether the size of the block is the minimum size allowed by the quadtree (test step E2611).

In this case, the current configuration is accepted for the block and the element is extracted from the list at step E2612 since this would be situated permanently at the top of the list, and finally step E2602 is next returned to directly since the order of the data has not been changed.

Otherwise, when the size of the block is not yet the minimum size allowed, the block is partitioned into four sub-blocks in a partitioning step E2613.

For each of these sub-blocks, the minimum-complexity technique is applied and the resulting distortion is calculated, updating the consumed complexity (that is to say the processing steps E21 to E24 are applied to each of these sub-blocks).

The four new blocks are then inserted in the list, which is once again sorted at step E2601.

It should be noted that the steps of inserting in the list and of sorting can be effected directly in a single step with a technique of sorting by insertion of an element one after the other.

As before, the optimisation algorithm stops at step E2605 when the consumed resource C attains the allocated resource $C_a$.

It should be noted that, in these second and third embodiments, described with reference to FIGS. 3 to 6, at the end there is the optimisation of all the codes necessary for the effecting of the actual coding of the digital image.

Figure 6:
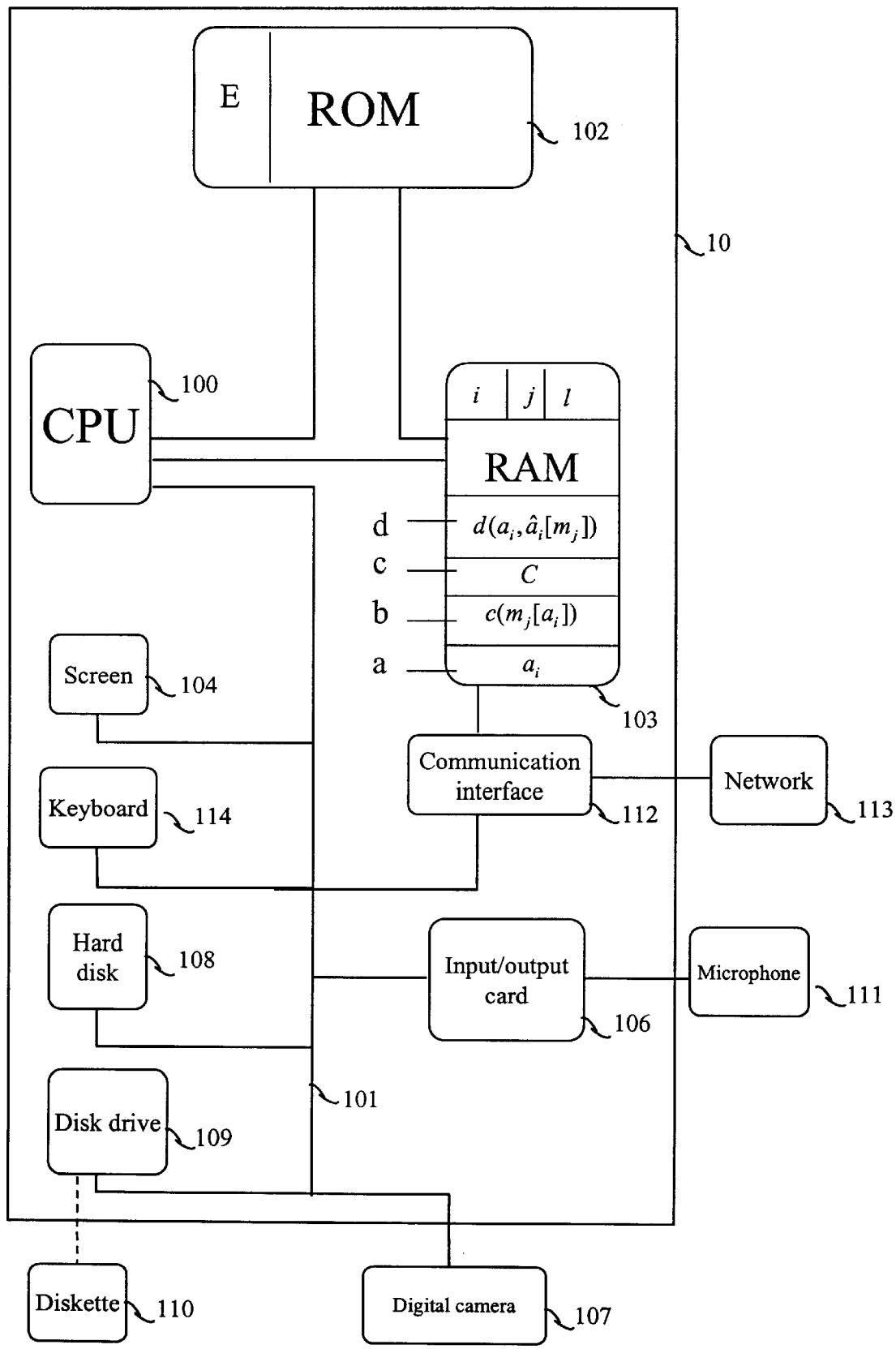
FIG. 6 is a block diagram illustrating a computer adapted to implement the compression method according to the invention.

A device for compression by blocks adapted to implement the invention is illustrated by way of example in FIG. 6.

In this example, the compression device is integrated into a computer 10, comprising a microprocessor 100, a read only memory 102 (ROM) and a random access memory 103 (RAM).

This compression device comprises coding configuration means 100, 102, 103 adapted to associate, with each block $a_i$ of digital data, a coding technique $m_j$ chosen from amongst a set E of acceptable coding techniques as a function of a criterion. This set E of acceptable coding techniques was described above with reference to FIG. 1.

According to the invention, the choice criterion is a function of optimisation of the rate or distortion characterising the coding configuration under the constraint of a given computational resource $C_a$.

The different optimisation functions which can be used were cited above with reference to the compression method according to the invention.

As is clear from a reading of the previously described method, this compression device comprises calculation means 100, 102, 103 for each block of digital data $a_i$ and for each coding technique $m_j$ for a constituent consumed computational resource, prior choosing means 100, 102, 103 for a criterion amongst a function of optimisation of the rate or distortion characterising the coding configuration under the constraint of a given computational resource, a function of optimisation of the rate characterising the coding configuration under the constraint of a given distortion and a function of optimisation of the distortion characterising the coding configuration under the constraint of a given rate, and possibly means of partitioning 100, 102, 103 into blocks of digital data representing physical quantities adapted to effect an adaptive partitioning into blocks under the constraint of a given computational resource.

The read only memory 102 is adapted to store a program for compression by blocks of digital data, and the random access memory 103 comprises registers for storing variables modified during the running of the program.

The read only memory 102 can store notably the set E of acceptable coding techniques. The random access memory 103 comprises, non-limitatively, a register a for storing the blocks $a_i$, a register b for storing the constituent computational resources $c(m_j[a_i])$, a register c for storing the consumed computational resource C, a register d for storing the estimated value of the distortion $d(a_i, â_i[m_j])$ and registers i, j, l for storing respectively the current indices i, j, I.

The microprocessor 100 is also adapted to supply the value of a given computational resource $C_a$ at a given instant.

In other words, the operating system must be capable of effecting a reservation of the computational resource at a given instant for a given period (it is a case of the capacity known as CPU scheduling) and to make visible this available computational resource.

This microprocessor 100 is integrated into the computer 10, which itself can be connected to different peripherals, for example a digital video camera 107 or a microphone 111, by means of an input/output card 106, or a scanner (not shown) or any other means of acquiring and storing digital images such as a digital printer or a digital photographic apparatus.

This computer 10 has a communication interface 112 connected to a communication network 113 so as to be able to receive or transmit digital information to be compressed or already compressed.

The computer 10 also has means of storing compressed data, such as a hard disk 108, or is adapted to cooperate by means of a disk drive 109 with removable document storage means, for example diskettes 110.

Naturally, the diskettes 110 can be replaced by any information carrier such as a CD-ROM or a memory card.

These fixed or removable storage means can also include the code of the compression method according to the invention, which, once read by the microprocessor 100, will be stored in the hard disk 108.

By way of variant, the program enabling the compression device to implement the invention can be stored in the read only memory 102. The same applies to the parameters for the coding techniques used by the program.

As a second variant, the program can be received in order to be stored as described previously by means of the communication network 113.

The computer 10 also has a screen 104 for displaying the information to be compressed or for example for serving as an interface with an operator, who will be able to parameterise the compression mode and parameters (the number and nature of the coding techniques employed) by means of the keyboard 114 or any other means (mouse for example).

The central unit 100 (CPU) will execute the instructions relating to the implementation of the invention. On powering up, the programs and methods relating to the invention stored in a non-volatile memory, for example the read only memory 102, are transferred into the random access memory 103, which will then contain the executable code of the invention as well as the variables necessary for implementing the invention.

It is also possible to improve the compression method according to the invention by adding new coding techniques to the set E, transmitted either by the communication network 113 or by means of a diskette 110.

The communication bus 101 affords communication between the different subelements of the computer 10 or linked to it. The representation of the bus 101 is not limitative and notably the microprocessor 100 is able to communicate instructions to any sub-element directly or by means of another sub-element of the computer 10.

The entire compression device described above can also be incorporated in a videophone system on a transmission network, notably with a low transmission rate.

The compression method according to the invention used in this videophone system is particularly efficient since it makes it possible to take into account a time constraint in the coding configuration used and thus satisfactorily to compress digital images in real time.

The main advantage of the invention is to allow explicit management of the computational resource by the compression operation in order to make it possible to obtain the best possible compression, in the sense of a rate/distortion compromise with a limited computational resource (i.e. in a limited time).

Another advantage is to make it possible to configure the compression system in accordance with different modes corresponding to the different possible compression criteria and in particular to make it possible to compress in an optimum fashion in the sense of the usual rate/distortion criteria.

What is claimed is:

1. A method of compression by blocks of digital data representing physical quantities, comprising the steps of:
    a coding configuration step in which there is associated, with each block of digital data, a coding technique chosen from amongst a set of acceptable coding techniques according to a criterion, said choice criterion being a function of optimization of the rate or distortion characterizing the coding configuration under the constraint of a given computational resource, and
    a calculation step for each block of digital data and for each coding technique for a constituent consumed computational resource by means of the coding technique expressed in calculation time,
    wherein the computational resource incorporates the calculation time for obtaining said constituent consumed computational resource and the consumed computational resource for resolution of the optimisation function.

2. The compression method according to claim 1, wherein said optimisation function is adapted to minimise a rate associated with the coding configuration for a computational complexity less than a given calculative resource.

3. The compression method according to claim 1, wherein said optimisation function is adapted to minimise a mean distortion associated with the coding configuration for a computational complexity less than a given computational resource.

4. The compression method according to claim 1, wherein said optimisation function is adapted to minimise an upper distortion bound associated with the coding configuration for a computational complexity less than a given computational resource.

5. The compression method according to claim 1, further comprising a prior step of choosing a criterion amongst a function of optimisation of the rate or distortion characterising the coding configuration under the constraint of a given computational resource, a function of optimisation of the rate of the coding configuration under the constraint of a given distortion and a function of optimisation of the distortion characterising the coding configuration under the constraint of a given rate.

6. The compression method according to claim 1, wherein said set of acceptable coding techniques comprises techniques of inter coding, including a predictive coding by movement compensation, a coding by time prediction or a coding by multilinear prediction, and intra coding techniques, including a coding by spectral transformation or a coding by vector quantisation.

7. The compression method according to claim 1, further comprising a step of partitioning into blocks of digital data representing physical quantities in which the partitioning of blocks is effected by means of an adaptive partitioning under the constraint of a given computational resource.

8. The compression method according to claim 1, further comprising a step of partitioning into blocks of digital data representing a digital image.

9. The compression method according to claim 1, further comprising a step of partitioning into blocks of digital data representing a digital video signal.

10. A device for compression by blocks of digital data representing physical quantities, comprising:
coding configuration means adapted to associate, with each block of digital data, a coding technique chosen from amongst a set of acceptable coding techniques as a function of a criterion, wherein said choice criterion is a function of optimisation of the rate or distortion characterising the coding configuration under the constraint of a given computational resource, and
calculation means for each block of digital data and for each technique of coding a constituent consumed computational resource by said coding technique expressed in calculation time,
wherein the computational resource incorporates the calculation time for obtaining said constituent consumed computational resource and the consumed computational resource for resolution of the optimisation function.

11. The compression device according to claim 10, wherein said optimisation function is adapted to minimise a rate associated with the coding configuration for a computational complexity less than a given computational resource.

12. The compression device according to claim 10, said optimisation function is adapted to minimise a mean distortion associated with the coding configuration for a computational complexity less than a given computational resource.

13. The compression device according to claim 10, wherein said optimisation function is adapted to minimise an upper bound distortion associated with the coding configuration for a computational complexity less than a given computational resource.

14. The compression device according to claim 10, further comprising means for choosing a criterion amongst a function of optimisation of the rate or distortion characterising the coding configuration under the constraint of a given computational resource, a function of optimisation of the rate characterising the coding configuration under the constraint of a given distortion and a function of optimisation of the distortion characterising the coding configuration under the constraint of a given rate.

15. The compression device according to claim 10, wherein said set of acceptable coding techniques comprises inter coding techniques, including a predictive coding by movement compensation, a coding by time prediction or a coding by multilinear prediction, and intra coding techniques, including a coding by spectral transformation or a coding by vector quantisation.

16. The compression device according to claim 10, further comprising means of partitioning into blocks of digital data representing physical quantities adapted to effect an adaptive partitioning into blocks under the constraint of a given computational resource.

17. The compression device according to claim 10, further comprising means of partitioning into blocks of digital data representing a digital image.

18. The compression device according to claim 10, further comprising means of partitioning into blocks of digital data representing a digital video signal.

19. The compression device according to claim 10, said device being incorporated in a microprocessor, a read only memory adapted to store a program for compression by blocks of digital data, and a random access memory comprising registers for storing variables modified during the running of said program.

20. The compression device according to claim 19, wherein said microprocessor is adapted to supply the value of a given computational resource at a given instant.

21. A computer, comprising a compression device according to claim 10.

22. A digital image processing apparatus, comprising a compression device according to claim 10.

23. A digital photographic apparatus, comprising a compression device according to claim 10.

24. A digital camera, comprising a compression device according to claim 10.

25. A videophone system on a transmission network, comprising a compression device according to claim 10.

26. A computer program product, readable by a computer, comprising software code portions adapted to implement the compression method according to claim 1 when it runs on the computer.

* * * * *

UNITED STATES PATENT AND TRADEMARK OFFICE
CERTIFICATE OF CORRECTION

PATENT NO. : 6,445,312 B1
DATED : September 3, 2002
INVENTOR(S) : Eric Nguyen

It is certified that error appears in the above-identified patent and that said Letters Patent is hereby corrected as shown below:

Column 1,
Line 48, "/SC29NVG11/" should read -- /SC29/WG11/ --; and
Line 60, "MPEG4" should read -- MPEG-4 --.

Column 5,
Line 56, "/SC29WG11/" should read -- /SC29/WG11/ --; and
Line 64, "various" should read -- varies --.

Column 10,
Line 67, close up right margin.

Column 13,
Line 59, close up right margin; and
Line 60, close up left margin.

Signed and Sealed this

First Day of July, 2003

JAMES E. ROGAN
*Director of the United States Patent and Trademark Office*